(No Model.)

H. HARIG.
INSECT TRAP.

No. 600,530.  Patented Mar. 15, 1898.

WITNESSES
Sherwood R. Taylor
Harry Toda

INVENTOR
Henry Harig
by his attorney
Arthur E. George

UNITED STATES PATENT OFFICE.

HENRY HARIG, OF CINCINNATI, OHIO.

INSECT-TRAP.

SPECIFICATION forming part of Letters Patent No. 600,530, dated March 15, 1898.

Application filed November 22, 1897. Serial No. 659,378. (No model.)

*To all whom it may concern:*

Be it known that I, HENRY HARIG, a citizen of the United States, residing at Cincinnati, in the county of Hamilton and State of Ohio, have invented a certain new and useful Insect-Trap, of which the following is a specification.

My invention relates to novel means for entrapping roaches and similar insects.

The object of my invention is to produce a simple inexpensive article to which insects will be allured and imprisoned in seeking a hiding-place.

My invention consists in the novel construction of the device, in the parts and combination of parts, and in the whole as an article of manufacture.

Figure 1:
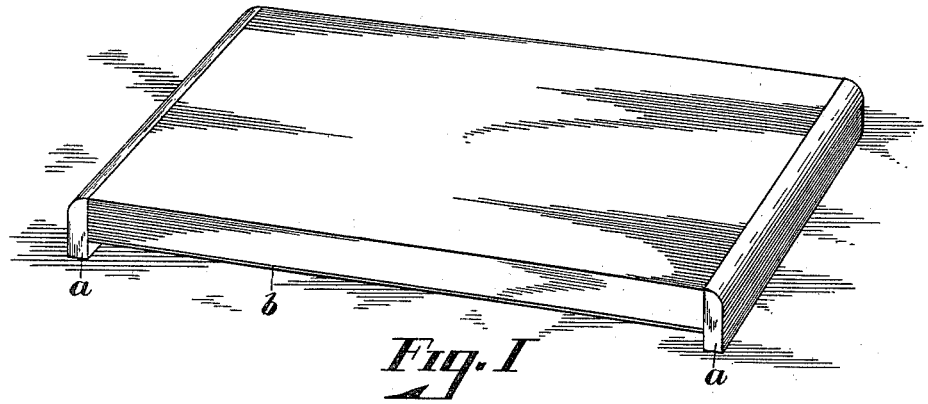
Figure 2:
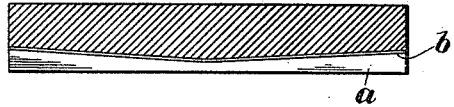
Figure 3:
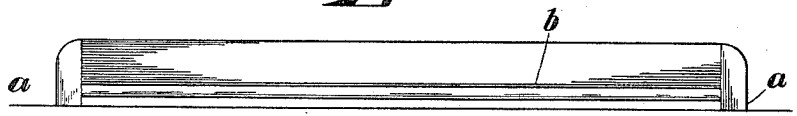
Figure 4:
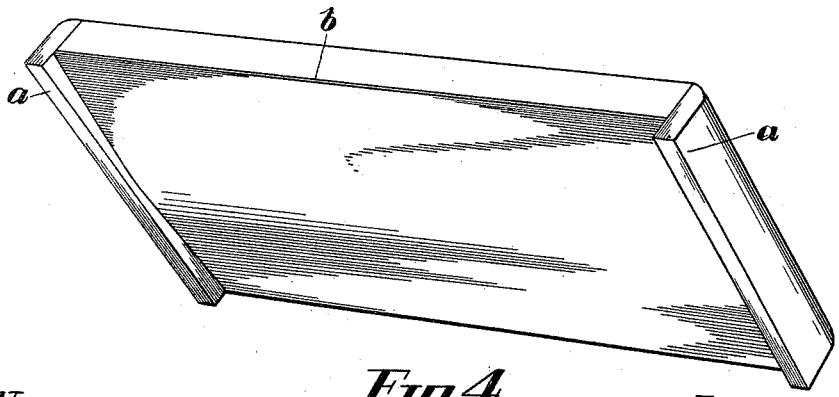

In the drawings, Figure 1 is a perspective view showing my trap in position for use. Fig. 2 is a vertical cross-section of the same, showing the lower contour of the trap. Fig. 3 is an elevation of the trap, showing one of the side entrances to it. Fig. 4 is a perspective view showing the preferred shape of the bottom.

My trap may be constructed of wood or other suitable material and is preferably formed rectangular in shape, as shown in the drawings. When so constructed, the bottom of the trap is partially cut away to form a tapering opening from each outer edge toward the center when the supports $a$ $a$ rest upon the floor. The wedge-shaped openings may be as large or small as desired, according to the size of insects to be caught, and the openings gradually diminished in size toward the center, so that insects of various sizes and kinds may be caught by the same trap, the larger ones near the outer part of the opening and the smaller ones near the center.

It is desirable to have a space left between the trap and the floor across the entire bottom sufficient to allow the adhesive material to be placed thereon without coming in contact with the floor.

To the inwardly and downwardly sloping surface I secure, by thumb-tacks or other suitable means, adhesive paper $b$ or other sticky substance, so that when the trap is placed upon the floor and the roaches or other insects enter the opening far enough for their backs to come in contact with the adhesive substance they are securely held thereto.

It is a natural trait of roaches and similar objectionable insects which infest dwellings to seek hiding in cracks or crevices or beneath some object. This trap is so made that from outward appearance it would present such an opening to view for the insects to enter, and there being nothing upon the floor or elsewhere to apprise the insects of the character of the supposed retreat they readily enter the opening and seek hiding in the narrower space, and in doing so they come in contact with the adhesive material and are thus caught in the trap.

After the trap is full of insects the paper may be removed and replaced with fresh paper and ready for another setting and the operation repeated as often as the paper is filled with insects.

Some of the advantages of this trap are certainty and efficiency in catching the insects, cheapness in construction and cost of use, and also that it prevents the adhesive paper or other similar substance from coming in contact with drapery or furniture or the clothing of persons in the house, such as would be the case if it were lying upon the floor with the adhesive portion exposed.

I claim—

As an article of manufacture an insect-trap having one surface beveled from its outer extremities downwardly toward its center to form a tapering opening when said surface is placed in close proximity to the floor, said surface being covered with an adhesive substance whereby insects will be entrapped, substantially as described.

HENRY HARIG.

Witnesses:
HARRY GODO,
ERNST REHM.